United States Patent
Menon et al.

(10) Patent No.: US 11,090,816 B2
(45) Date of Patent: *Aug. 17, 2021

(54) ROBOTIC TOOLSET AND GRIPPER

(71) Applicant: Dexterity, Inc., Palo Alto, CA (US)

(72) Inventors: Samir Menon, Palo Alto, CA (US); Zhouwen Sun, Santa Clara, CA (US); Robert Hegdahl, Hayward, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,972

(22) Filed: Nov. 6, 2019

(65) Prior Publication Data

US 2020/0070361 A1 Mar. 5, 2020

Related U.S. Application Data

(63) Continuation of application No. 16/034,544, filed on Jul. 13, 2018, now Pat. No. 10,500,735.

(51) Int. Cl.
*B25J 15/00* (2006.01)
(52) U.S. Cl.
CPC ................................ *B25J 15/0061* (2013.01)
(58) Field of Classification Search
CPC ........ B25J 15/0061; B25J 15/06; B25J 15/08; B25J 15/10; B25J 15/0047; B25J 15/0052; B25J 9/0015
USPC ...................................... 294/213, 119.1, 86.4
See application file for complete search history.

(56) References Cited

U.S. PATENT DOCUMENTS

| | | | |
|---|---|---|---|
| 1,251,413 A | 12/1917 | Pascall | |
| 4,132,318 A * | 1/1979 | Wang | B25J 13/082 294/86.4 |
| 4,940,454 A | 7/1990 | Siragusa | |
| 8,033,002 B2 * | 10/2011 | Lin | B25J 15/0061 29/434 |
| 8,240,729 B2 | 8/2012 | Vittor | |
| 8,936,291 B2 | 1/2015 | Yasuda | |
| 8,991,888 B2 | 3/2015 | Schlaich | |
| 10,124,489 B2 | 11/2018 | Chitta et al. | |
| 2006/0181092 A1 | 8/2006 | Kikut | |
| 2012/0039699 A1 | 2/2012 | Ward | |
| 2012/0263519 A1 | 10/2012 | Kotula | |
| 2012/0279342 A1 | 11/2012 | Yasukawa | |
| 2012/0286534 A1 * | 11/2012 | Harada | B25J 15/0057 294/213 |
| 2013/0001970 A1 | 1/2013 | Suyama | |
| 2013/0110289 A1 | 5/2013 | Cho | |
| 2013/0190925 A1 | 7/2013 | Miyoshi | |

(Continued)

*Primary Examiner* — Paul T Chin
(74) *Attorney, Agent, or Firm* — Van Pelt, Yi & James LLP

(57) ABSTRACT

A robot configured to use a gripper to grasp one or more tools is disclosed. In various embodiments, the robot comprises a robotic arm having a gripper disposed at a free moving end of the robotic arm, and a set of two or more tools configured to grasped or otherwise engaged by the gripper. Each tool in the set of two or more tools may be disposed in a corresponding tool holder, optionally attached to the robot or situated near the robot. The robot is configured to use the gripper to retrieve a selected tool from its tool holder to perform a task; use the tool to perform the task; and return the tool to its tool holder.

22 Claims, 8 Drawing Sheets

(56) References Cited

U.S. PATENT DOCUMENTS

| | | | | |
|---|---|---|---|---|
| 2014/0203582 A1* | 7/2014 | Harada | ................... | B25J 15/00 |
| | | | | 294/213 |
| 2016/0325438 A1 | 11/2016 | Li | | |
| 2019/0030732 A1* | 1/2019 | Kondoh | ................... | G01L 5/226 |
| 2019/0152054 A1* | 5/2019 | Ishikawa | ................... | B25J 9/163 |
| 2019/0351549 A1* | 11/2019 | Suzuki | ................... | B25J 9/1697 |

* cited by examiner

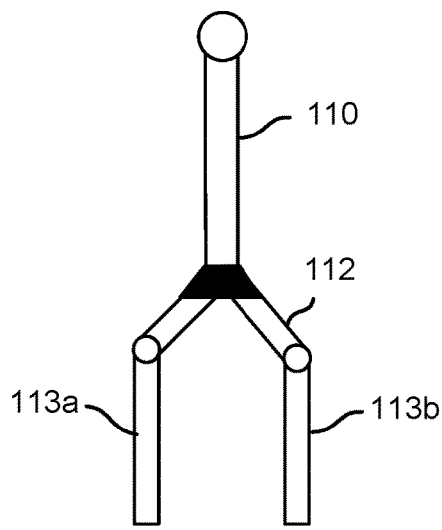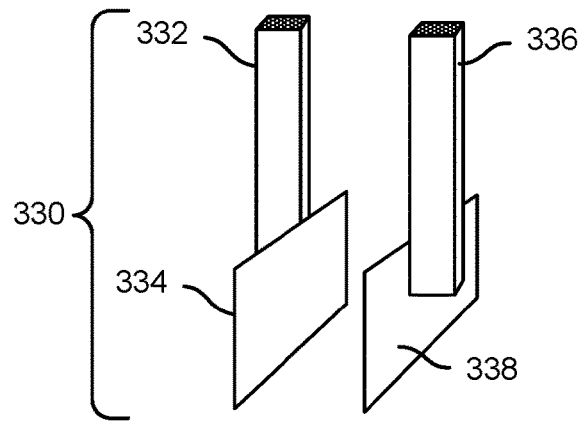
FIG. 3C
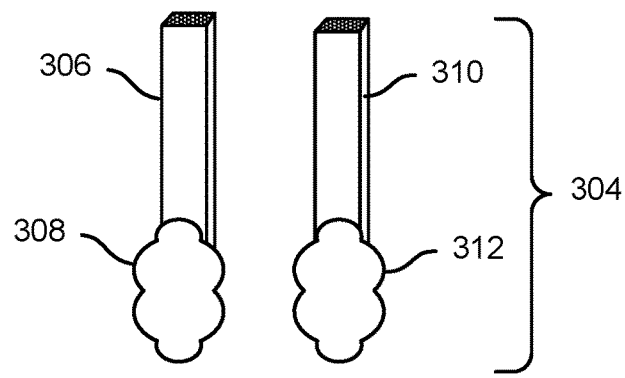
FIG. 3A
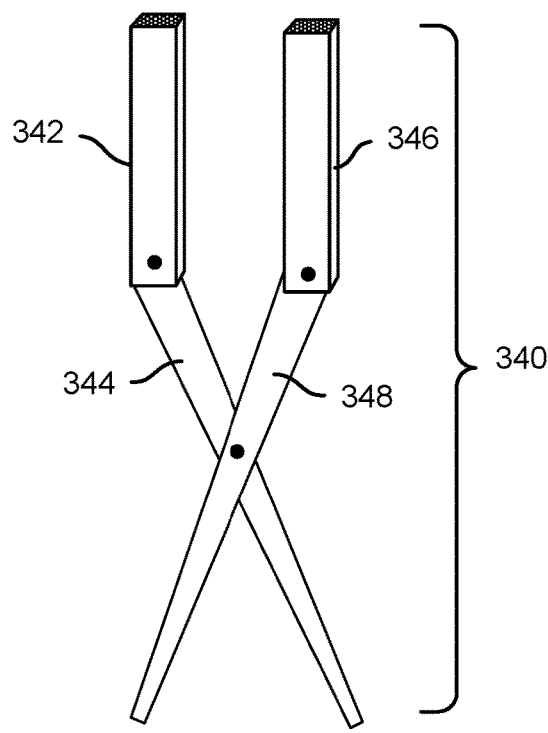
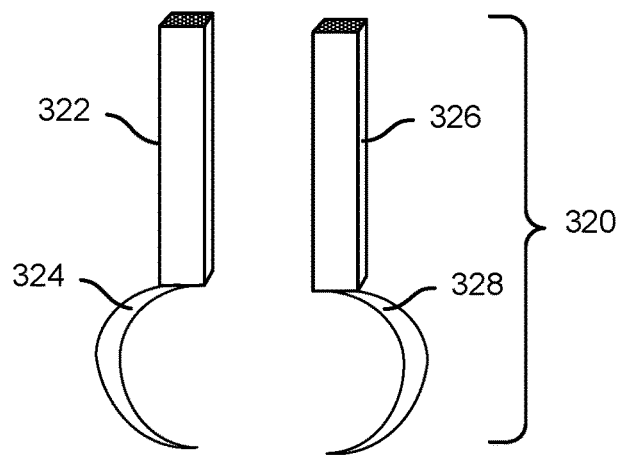
FIG. 3B
FIG. 3D

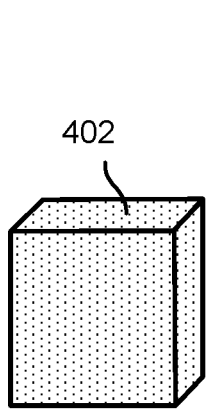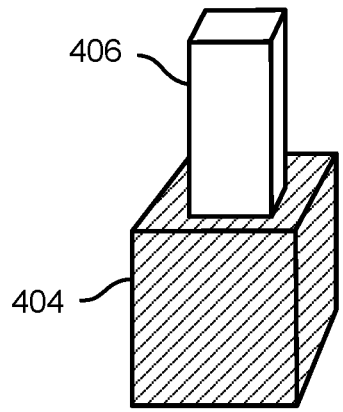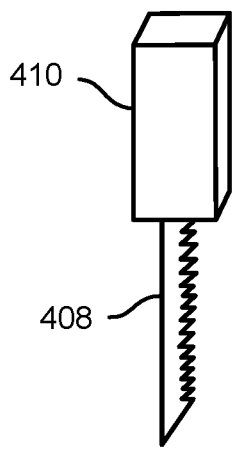
FIG. 4A　　　　　FIG. 4B　　　　　FIG. 4C
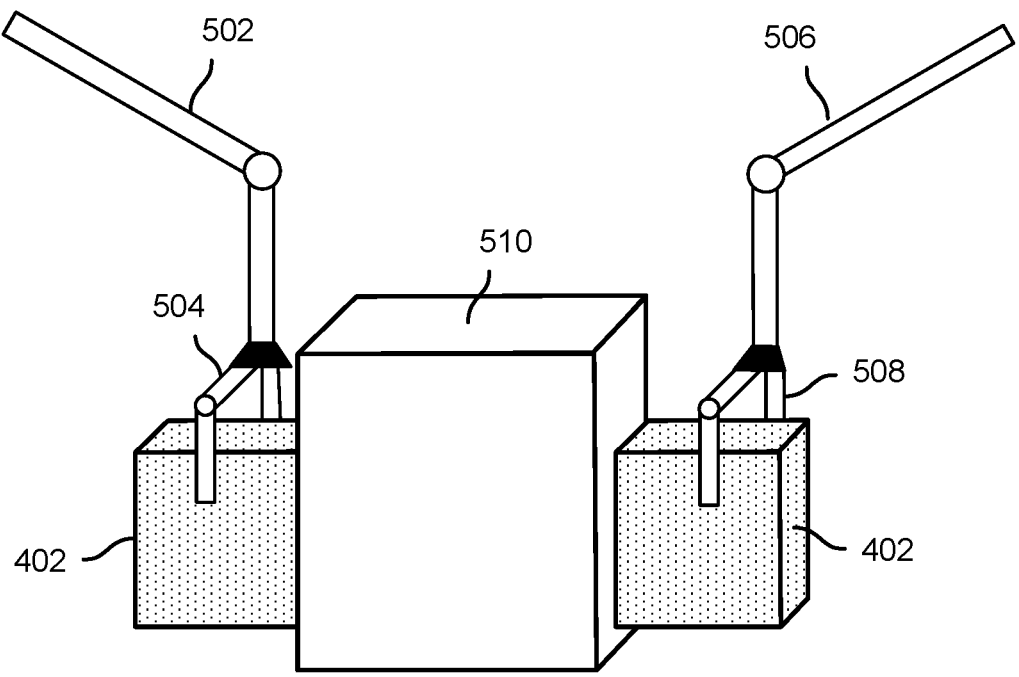
FIG. 5

ROBOTIC TOOLSET AND GRIPPER

CROSS REFERENCE TO OTHER APPLICATIONS

This application is a continuation of co-pending U.S. patent application Ser. No. 16/034,544, entitled ROBOTIC TOOLSET AND GRIPPER filed Jul. 13, 2018 which is incorporated herein by reference for all purposes.

BACKGROUND OF THE INVENTION

Robots have been used to perform a variety of tasks. Typically, a robot is configured to perform a predefined task or set of tasks. The robot may include a robotic arm or other operative member used to position, activate, and/or otherwise manipulate a permanently and/or manually affixed tool. Examples of such tools in industrial contexts include without limitation grippers, drills, welders, riveters, nozzles to apply paint or other chemicals, etc.

A gripper or other tool suitable for one task may not be (as) suitable for another task. For example, a robotic gripper of a given size may not be suitable to perform finer work, such as picking up a small object.

Manually changing the gripper or tool on a robot takes time and requires human labor, and in a commercial setting time and labor translate to higher cost and/or lower output.

BRIEF DESCRIPTION OF THE DRAWINGS

Various embodiments of the invention are disclosed in the following detailed description and the accompanying drawings.

FIG. 3A is a block diagram illustrating an embodiment of an interchangeable tool for a robotic gripper.

FIG. 3B is a block diagram illustrating an embodiment of an interchangeable tool for a robotic gripper.

FIG. 3C is a block diagram illustrating an embodiment of an interchangeable tool for a robotic gripper.

FIG. 3D is a block diagram illustrating an embodiment of an interchangeable tool for a robotic gripper.

FIG. 4A is a block diagram illustrating an embodiment of an interchangeable tool for a robotic gripper.

FIG. 4B is a block diagram illustrating an embodiment of an interchangeable tool for a robotic gripper.

FIG. 4C is a block diagram illustrating an embodiment of an interchangeable tool for a robotic gripper.

FIG. 5 is a block diagram illustrating an example of an object being picked up by one or more robots using interchangeable tools for a robotic gripper.

DETAILED DESCRIPTION

Figure 1:
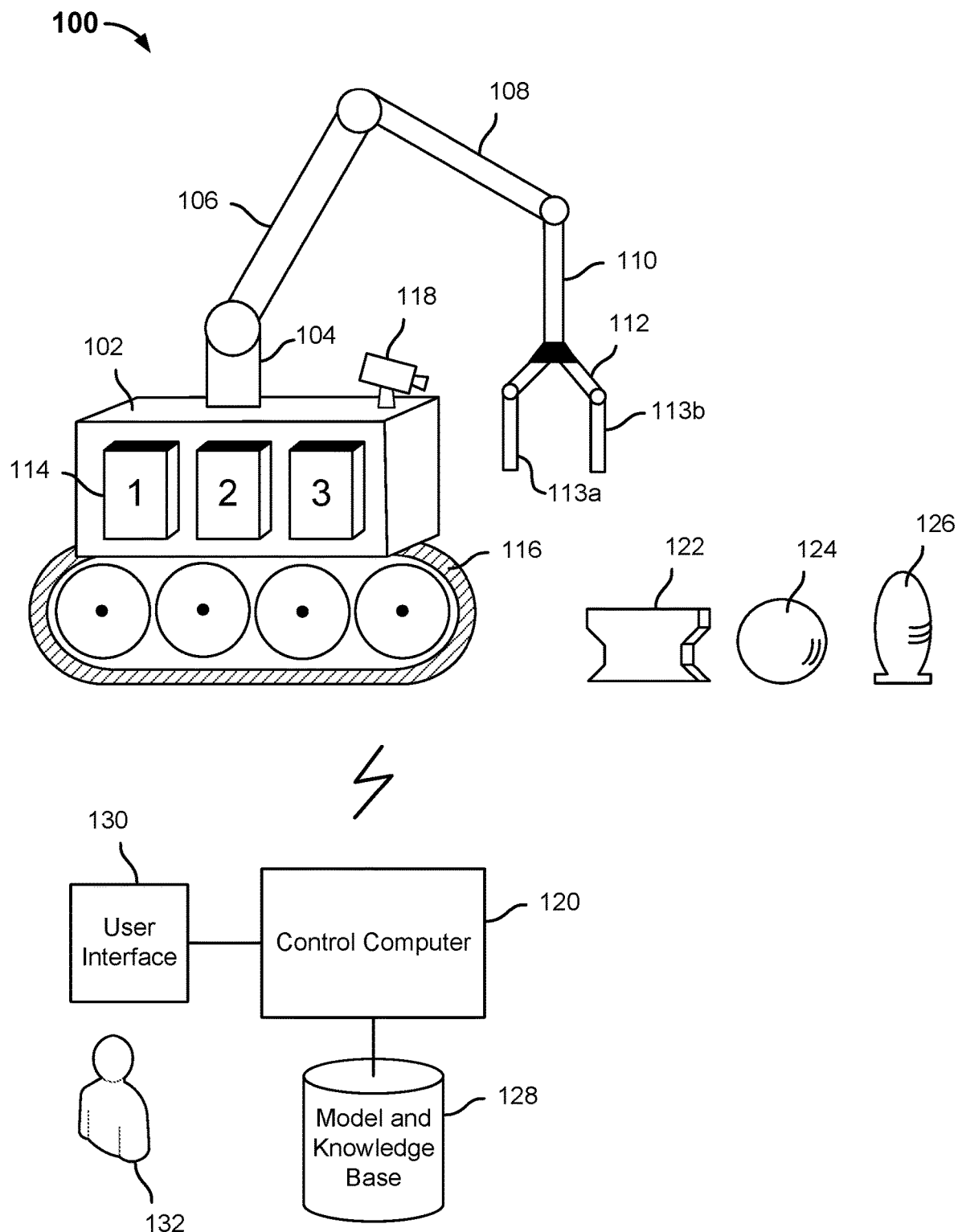
FIG. 1 is a block diagram illustrating an embodiment of a robot comprising a toolset and gripper.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic toolset and gripper are disclosed. In various embodiments, a robot is provided that includes a robotic arm having a gripper (e.g., a two or more digit robotic "hand") at a distal end. A toolset is provided on or near the robotic arm, such as in a permanent or detachable set of pockets or other receptacles, each of a size and configuration to receive an associated tool. In various embodiments, the robot is configured to use the gripper to retrieve a tool from the set to perform a task. In an autonomous mode, in some embodiments the robot determines based on information associated with the task, such as one or more attributes of an object to be picked up or otherwise interacted with, a (next) most suitable to tool to perform the task, retrieves the determined tool, and performs (or attempts to perform) the task. If a next task requires a different tool, the robot returns the previously-used tool to its receptacle and retrieves the tool needed to perform the next task.

In various embodiments, different tools are retrieved by the robot to perform different tasks, enabling a wider variety of tasks to be performed using a same gripper installed on a robotic arm or other robotic member.

FIG. 1 is a block diagram illustrating an embodiment of a robot comprising a toolset and gripper. In the example shown, robot 100 includes a base 102 and a robotic arm comprising an arm mount 104; arm segments 106, 108, and 110 connected via motorized articulating joints; and a gripper 112 comprising fingers 113a and 113b. While fingers 113a and 113b are shown in FIG. 1 as straight, non-articulating fingers, in various embodiments the gripper 112 may have articulating fingers (e.g., fingers comprising two or more movable segments, capable of conforming to the shape of an object being grasped) and/or be of a rigid shape that is not straight. In various embodiments, gripper 112 may include more than two fingers. For example, in some embodiments, gripper 112 may comprise a three (or more) finger adaptive gripper.

In the example shown in FIG. 1, tool holders 114 are mounted on a vertical side of base 102. In various embodiments, tool holders 114 (numbered "1", "2", and "3", respectively, in FIG. 1), are removable and/or capable of being swapped with other tool holders 114. For example, in some embodiments, robot 100 is configured to swap one or all of the tool holders 114 and replace them with other tool holders 114, such as ones that contain and are adapted specifically to house a specific alternative set of tools. In some embodiments, tool holders 114 are connected together and comprise a rigid or flexible interchangeable "tool belt". In some embodiments, robot 100 is configured to select and mount a tool belt comprising the tools needed to perform a given set of tasks.

In the example shown in FIG. 1, base 102 of robot 100 is mounted on a propulsion chassis 116, in this example a track type propulsion system. In other embodiments, robot 100 may be stationary (e.g., mounted in a fixed location) or may include a propulsion mechanism other than a track type system, e.g., wheels, legs, etc.

In the example shown, robot 100 further includes a camera 118 mounted on base 102. In various embodiments, robot 100 may include one or more additional and/or other cameras, e.g., one or more cameras mounted on the robotic arm (106, 108, and 110) and/or gripper 112. In various embodiments, a control system of robot 100 uses image data generated by camera 118 to perform an assigned task or set of tasks. For example, in the example shown in FIG. 1, robot 100 may be tasked with picking up and placing a destination location (not shown) the objects 122, 124, and 126. The objects 122, 124, and 126 have different shapes, as shown in FIG. 1, and may have other differing attributes. For example, object 122 may be a very heavy item, such as an anvil. Object 124 may be heavy, e.g., a bowling ball, or very light and fragile, e.g., a hollow crystal ball. Likewise, object 126 may be heavy, such as an artillery round or a solid obelisk, or light, such as a fragile vase.

In various embodiments, robot 100 may be assigned the task to pick and place objects 122, 124, and 126 via a control station, such as control computer 120. In the example shown in FIG. 1, control computer 120 is in wireless communication with robot 100. Robot 100 may include control elements housed in base 102, or elsewhere, such as wireless (or wired) communication interface (e.g., a network interface card, WiFi transceiver, Bluetooth™ or other near field transceiver, etc.) and one or more processors or microcontrollers, not shown in FIG. 1. In the example shown in FIG. 1, a model and knowledge base 128 is used to perform tasks assigned to robot 100. For example, a model of robot 100 may be used to determine how to drive robot 100 to a position to perform a task or subtask, and how to manipulate the robotic arm of robot 100 (e.g., by driving motors at the joints connecting base 104, segments 106, 108, and 110, and gripper 112 to adjacent ones of each other) to use and manipulate gripper 112 to perform tasks. The knowledge base may include a model that has been trained via machine learning techniques to enable robot 100 and/or control computer 120 to recognize—e.g., based on image data generated by camera 118—salient attributes of objects to be picked up by robot 100.

In some embodiments, if robot 100 cannot classify an object, robot 100 is configured to employ alternate strategies to determine the attributes required to be known to perform a task. For example, in some embodiments, robot 100 may determine a weight attribute at least in part by gripping an object and attempting to move it with minimal and/or varying degrees of force. In some embodiments, rigidity may be assessed by gently squeezing the object with gripper 112. In some embodiments, if needed robot 100 and/or control computer 120 may be configured to invoke human intervention, e.g., to provide manual input regarding a given attribute (weight, rigidity, fragility, etc.) In various embodiments, robot 100 continues to learn to recognize attributes, such as by updating its knowledge base to reflect information determined by experimentation and/or human intervention.

In various embodiments, a task or set of tasks may be assigned via a user interface 130 of control computer 120. For example, a human (or non-human, e.g., a robot, computer, or other machine) 132 may provide inputs via user interface 130. For example, a task may be assigned by selecting via user interface 130 an option to define and start a "pick and place" operation, and by using a cursor or other input device to designate objects 122, 124, and 126 as the objects to be picked up and placed in designated locations. For example, robot 100 may be tasked with picking up objects 122, 124, and 126 and placing them in a destination location (e.g., a box, a shelf, a cargo area of a truck or other vehicle) and/or each in a corresponding designated location. In some embodiments, user interface 130 may (optionally) be used to provide attributes of objects 122, 124, and 126, if known to user 132, such as by designating one or more of them as "heavy" or "fragile".

In various embodiments, robot 100 is configured to determine a set of tools required (or, in some embodiments, optimal) to perform a set of tasks, and to use the determined tools to perform the tasks. In various embodiments, robot 100 is configured to carry the tools in tool holders 114. As each tool is required, robot 100 uses gripper 112 to obtain the tool from its corresponding holder 114, performs the task (or subtask) with the tool, and returns to tool to its holder 114. In some embodiments, a tool held in its corresponding tool holder 114 may be graspable by gripper 112. Gripper 112 is positioned over the holder 114 corresponding to the required tool, gripper 112 is inserted into the holder and/or around the tool, and is used to grasp and extract the tool from the holder 114. In some embodiments, a synchronized activation of a release mechanism in holder 114, and/or deactivation of a locking mechanism, is performed to enable the gripper 112 to extract the tool.

In some embodiments, gripper 112 does not (necessarily) grasp the tool. For example, in some embodiments and/or for some tools, the fingers 113a and 113b of gripper 112 may be inserted into the tool.

In various embodiments, a tool in tool holders 114 may comprise a mechanism to actuate the tool or a portion thereof, e.g., pneumatically, by electric motor(s), etc. In some embodiments, connections may be incorporated into gripper 112 to provide one or more of electric power, control signals, compressed air or other pneumatic fluid, etc. to the tool being retrieved.

In various embodiments, one or more of the robot 100 and control computer 120 may include control logic to determine attributes of objects with respect to which tasks are to be performed, such as objects 122, 124, and 126 in the example shown in FIG. 1, and to determine a set of tools to perform the tasks. The control logic includes logic to determine whether the required (or optimal) tools are in the holders 114, and if not to swap out the tools and/or the set of holders 114 with the required tools and/or set of holders 114 comprising the required tools. Once the required tools are in holders 114 on base 102, robot 100 uses the tools to perform the tasks. The tools may be selected based on attributes such as the shape of each object, its size, its density or other indication of the object's weight, its fragility, etc.

Figure 2:
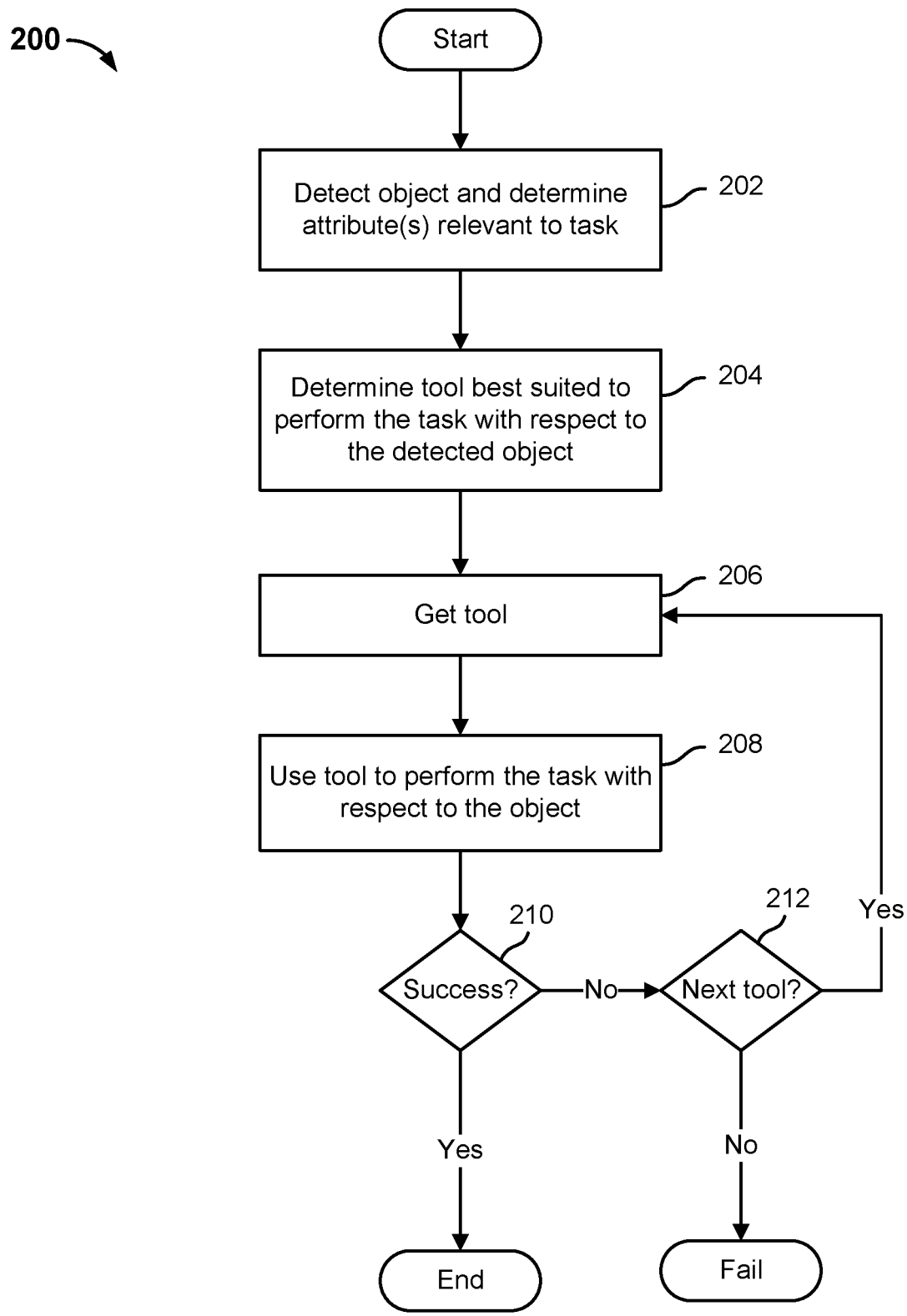
FIG. 2 is a flow chart illustrating an embodiment of a process to use an interchangeable toolset to perform a set of tasks.

FIG. 2 is a flow chart illustrating an embodiment of a process to use an interchangeable toolset to perform a set of tasks. In various embodiments, the process 200 of FIG. 2 may be performed by one or more processors configured to control a robot, such as a processor comprising one or more of robot 100 and control computer 120, in the example shown in FIG. 1. In the example shown in FIG. 2, an object with respect to which a given task or subtask is to be performed is detected and one or more attributes relevant to the task is/are determined (202). In some embodiments, computer (machine) vision, machine learning, artificial intelligence, and related techniques may be used to detect, classify, determine the orientation of, and determine applicable attributes of an object in the robot's field of view. Attributes such as size, weight, density, rigidity, coarseness, fragility, material, surface texture, etc. may be determined in various embodiments. A tool (or tools) best suited to perform the assigned task with respect to the detected object is/are determined (204). In some embodiments, an ordered (e.g., ranked by numerical or other suitability score) set of tool options may be determined, including a most suitable tool and one or more next-most suitable tools in order. The most (or next most) suitable tool is obtained (206). For example, a gripper or other manipulative hand or proto-tool is used, in various embodiments, to grasp the tool, obtain the tool by insertion into the tool, etc. The tool is used (or attempted to be used) to perform the task (208).

If the task is not completed successfully (210), e.g., after a configured, learned, or otherwise determined number of tries, it is determined whether a next suitable tool is available to be tried (212). For example, a next tool on an ordered list of suitable tools may be tried. Or, an attribute learned during a prior attempt (one or more of 204, 206, 208, and 210) may be tried. For example, in some embodiments, capacitive sensors or other sensors may be used to detect slippage, e.g., that an object the robot is attempting to pick up slipped between the operative elements of the tool being used by the robot to attempt to pick the object up. In response, the robot and/or control computer may determine the object is heavier and/or more slippery than originally determined, and may select a tool with a greater lifting capacity, higher friction fingers, etc.

If an attempt to perform the task is not successful and no further tool is available to be tried (212), the process ends and a "fail" result is returned. In some embodiments, a "fail" result of the process 200 prompts a human to intervene. The human may use a user interface to manually perform the task, select a more suitable tool, prompt the robot to change out the toolset for a heavier (or lighter) duty set, or a set that is otherwise more suitable to the task, etc.

If after an unsuccessful attempt to perform a task with a current tool (206, 208, 210) a next tool to be tried is available (212), in the example shown the next tool is retrieved (206) and used to perform (or attempt to perform) the task (208). Future retries with subsequent tools, if any, may be attempted (206, 208, 210, 212, etc.)

Once the task has been completed successfully (210) or has failed due to not being completed successfully and no further tools being available to try (210, 212), to process 200 ends.

In various embodiments, a potentially wide variety of interchangeable tools capable of being grasped, held, inserted into, or otherwise picked up, engaged, manipulated and/or used by a robot via its gripper, hand, or other robot arm distal end appendage may be provided. Certain of the following figures illustrate examples of such interchangeable tools in various embodiments. In some embodiments, a tool as disclosed herein may be attached to a gripper, stub, or other distal end of a robotic arm via a magnetic snap-locking mechanism. In some embodiments, magnetic alignment is used to align the tool to the gripper, e.g., to make connections for the transfer of power, data, etc.

FIG. 3A is a block diagram illustrating an embodiment of an interchangeable tool for a robotic gripper. In the example shown, toolset 304 comprises a pair of interchangeable "fingers" or finger tips into which corresponding finger elements of a robotic gripper may be inserted. In this example, toolset 304 includes two tools, a first comprising a hollow rectangular (or other cross-section, e.g., round, oval, hex, irregular, variable, etc.) shaft 306 with a soft (e.g., cushioned) end piece 308 and a second comprising hollow rectangular shaft 310 and soft end piece 312. In some embodiments, toolset 304 may be picked up and used by the robot to manipulate fragile items, such as items that could be scratched if handled directly by the gripper.

The robotic gripper 112 of FIG. 1 is shown with fingers 113a and 113b positioned above the shafts 306 and 310. In some embodiments, the toolset 304 may be held in place in a holster or other tool carrier, e.g., in the upright position as shown. The robot (e.g., robot 100 of FIG. 1) may be configured to position the robotic gripper (e.g., gripper 112) over the tool. The robot may be configured, e.g., via a model, configuration data, sensing (e.g., reading a bar code or RF tag), and/or other data to know which tool is located in which tool holder. The robot may use a model of its own geometry to position its gripper over the tool and insert the gripper into the tool. Sensors on one or more of the gripper, the tool, and the tool holder may be used to detect that the gripper has been fully inserted. Mechanical or electromechanical mechanisms may be used to look the gripper into the tool and/or the tool onto the gripper. Sensors and associated logic may be used to release the tool from the tool holder once the tool is fully engaged by the gripper, enable the robot to extract the gripper—with the tool on gripper and/or in the grasp of the gripper—and use the tool to perform the task.

FIG. 3B is a block diagram illustrating an embodiment of an interchangeable tool for a robotic gripper. In this example, toolset 320 includes two tools, one for each of two gripper fingers. Each includes a shaft (322, 326) and a sickle-shaped tool at the distal end (324, 328). In various embodiments, the toolset may be used to pick up objects into which the sickle-shaped tools (324, 328) may be driven to some depth (e.g., a block of ice or wood) without damaging the object, and/or to pick up a heavier object that might otherwise slip out of the gripper and/or having a shape to which the sickle-shaped tools (324, 328) conforms or conforms more fully than the gripper fingers (e.g., 113a and 113b).

FIG. 3C is a block diagram illustrating an embodiment of an interchangeable tool for a robotic gripper. In the example shown, toolset 330 includes tools having hollow rectangular shafts (332, 336) to receive the gripper fingers and wide rectangular paddle ends (334, 338). In some embodiments, toolset 330 may be selected by a robot to pick up a large box or other item having opposite vertical sides. The large surface area of the paddles 334, 338 may enable such an item to be picked while applying less compressive (squeezing) force, due to the friction associated with the large surface area of the paddles 334, 338 compared to the bare gripper fingers.

FIG. 3D is a block diagram illustrating an embodiment of an interchangeable tool for a robotic gripper. In the example shown, tool 340 comprises a scissor-like cutting tool. The tool 340 includes rectangular shafts 342, 346 to receive the gripper fingers, and scissor blades 344 and 348. Alternating closing and opening of the gripper fingers, once inserted, forces the shafts 342 and 346 alternatingly together and apart, causing blades 344 and 348 to alternately together and apart in a familiar scissoring motion.

FIGS. 3A through 3D show a variety of tools into which robotic gripper fingers may be inserted to retrieve, extract, and manipulate the tool. A wide variety of other tools retrieved by inserting gripper fingers into receptacles, such as the rectangular shafts of the tools shown in FIG. 3A through 3D, are contemplated.

In various embodiments, a toolset as disclosed herein may include one or more implements that the gripper is configured to grasp and use as a tool, e.g., to hold, lift, push, or otherwise move an object; to tap, press, pound, strike, impact, crush, or otherwise apply force to an object; or a blade, serrated edge, wedge, spike, saw or other tool to cut or bore into an object.

FIG. 4A is a block diagram illustrating an embodiment of an interchangeable tool for a robotic gripper. In the example shown, block 402 comprises a tool that in various embodiments a robotic gripper is configured to grasp and use as a tool. In some embodiments, block 402 may be stowed in a tool holder, such as tool holders 114 of FIG. 1, from which the robot may be configured to retrieve the block 402, use it to perform a task, and return the block 402 once the robot is done using the block 402. In various embodiments, block 402 may be of a material suitable to a given task, such as rubber, foam, wood, or solid metal, depending on the nature of the task. In some embodiments, one or more robots and/or one or more robotic arms comprising a single robot, each holding a corresponding block 402, may cooperate to perform a given task.

FIG. 4B is a block diagram illustrating an embodiment of an interchangeable tool for a robotic gripper. In the example shown, the striking tool of FIG. 4B comprises a hammer or other striking head or block 404 and a handle 406. The block 404 may be molded on and/or bonded on or to an end of the handle 406. In various embodiments, a robot and/or robotic arm is configured to grasp the handle 406 of the tool of FIG. 4B, and to swing, translate, or otherwise move the tool through space to cause the head or block 404 to strike, press against, or otherwise impact or interact with an object. A second robot and/or robotic arm may be used to hold the object in place, such as to position and hold a nail in a position to be hammered into a piece of wood, etc.

FIG. 4C is a block diagram illustrating an embodiment of an interchangeable tool for a robotic gripper. In the example shown, a saw comprising a serrated blade 408 and a handle 410 is provided. In various embodiments, a robot and/or robotic arm is configured to grasp the handle 410 of the tool of FIG. 4C, position the blade 408 adjacent an object or material to be cut, and move the handle 410 in a reciprocating motion while advancing the blade 408 through the object or material to cut the object or material.

In various embodiments, a toolset as disclosed herein may include zero, one, or more of each of the tools of FIGS. 4A, 4B, and 4C. For example, a tool "belt" or other interchangeable set of tools for a robot as disclosed herein may include one each of the tools of FIGS. 4A, 4B, and 4C. Alternatively, a tool set as disclosed herein may include two or more instances of one or more of the tools of FIGS. 4A, 4B, and 4C, each of a different size, consistency, material, etc., each one of which may be more suitable for a given task or type of task than another similar (or dissimilar) tool in the set. For example, a set of blocks like block 402 of FIG. 4, each of different size, may be included, and the robot may be configured to select, retrieve, use, and return to its holder a block of the most suitable size to perform a given task. Or, a set of blocks like block 402 of FIG. 4, each of different material, firmness, tackiness, etc., may be included, and the robot may be configured to select, retrieve, use, and return to its holder the block that is most suitable to perform a given task. Similarly, a tool set may include hammer-like tools, such as the tool of FIG. 4B, with differently shaped and/ro sized heads 404 and/or cutting tools, such as the tool of FIG. 4C, with blades of different serration patterns, hardness, etc., each most suitable for a corresponding set of tasks or types of task, e.g., cutting wood versus metal, etc.

FIG. 5 is a block diagram illustrating an example of an object being picked up by one or more robots using interchangeable tools for a robotic gripper. In the example shown, a first robotic arm 502 includes a gripper 504 that is holding a first block 402 and a second robotic arm 506 includes a gripper 508 that is holding a second block 402. The first and second robotic arms 502, 506 are being used cooperatively to press the respective blocks 402 to opposite sides of a large object 510, in this example a large box, e.g., to pick the object 510 up and place it in a destination location. Note that the size and configuration of the grippers 504, 508 is such that it may have been difficult for the object 510 to be picked up using the grippers 504, 508 without using the blocks 402.

In various embodiments, a tool to be used by a robot as disclosed herein may include mechanisms that translate the gripping action and force of two or more fingers or other digits of the gripper to a desired motion, range, location, or force. For example, a gripping motion of the gripper when inserted into a tool as disclosed herein may be translated by a mechanism comprising the tool to a finer range of motion, a more finely controlled amount of force, etc. Such a mechanism may be mechanical, electromechanical, electronically controlled, hydraulic, pneumatic, or any other technique that translates a gripping or squeeze motion on one scale to a desired motion and/or force on a target scale with which the tool is associated.

Figures 6A, 6B:
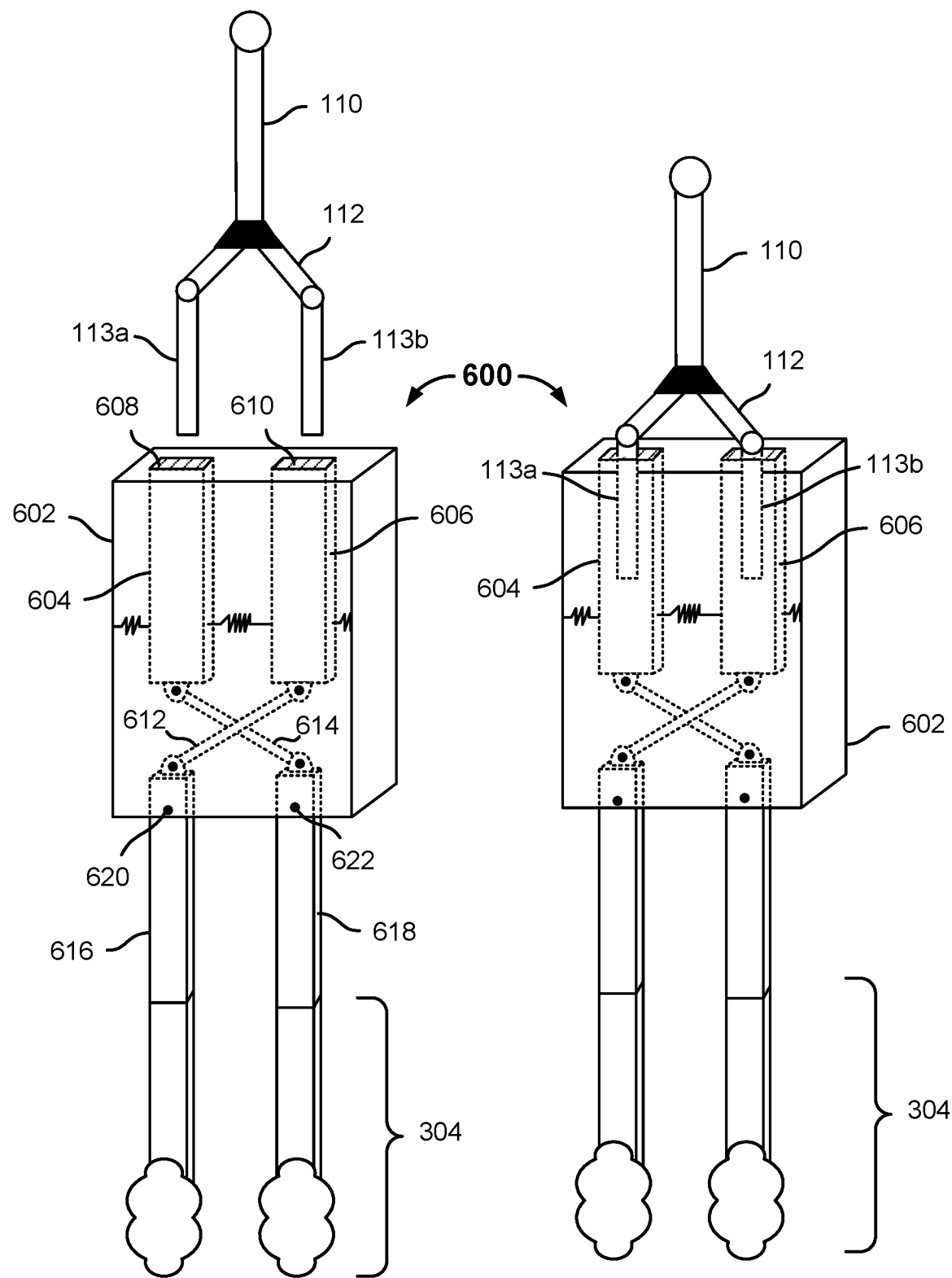
FIG. 6A is a block diagram illustrating an embodiment of an interchangeable tool for a robotic gripper.
FIG. 6B is a block diagram illustrating an embodiment of an interchangeable tool for a robotic gripper.

FIG. 6A is a block diagram illustrating an embodiment of an interchangeable tool for a robotic gripper. In the example shown, tool 600 includes a body 602 having hollow rectangular receptacles 604 and 606 of a size and shape suitable to receive fingers of a robotic gripper inserted through holes 608 and 610, respectively. Receptacles 604 and 606 are movable mounted in body 602 of tool 600, enabling the receptacles 604 and 606 to be squeezed together and moved apart within body 602 by closing and opening motion of gripper fingers inserted into receptacles 604 and 606. Tool 600 includes within body 602 mechanical linkages 612 and 614 positioned and connected to transmit to arms 616 and 618, respectively, force applied to receptacles 604 and 606 by closing and/or opening the grip of gripper fingers inserted into receptacles 604 and 606. In this example, the force transmitted via mechanical linkages 612 and 614 cause the arms 616 and 618 to rotate about pivots (e.g., pins or other fasteners) 620 and 622, respectively, causing the respective fingers of tool set 304 of FIG. 3A (or any other tools provided on the ends of arms 616 and 618) to move together or apart in response.

In various embodiments, mechanical linkage 612 and 614 represent any suitable mechanical linkage. In various embodiments, the specific mechanisms used to translate movement of the gripper fingers to movement of the operable elements of the tool are selected based on the force, scale, size, etc. of the desired tool and the task to be performed.

As shown in FIG. 6A, the robotic gripper 112 of FIG. 1 is positioned over the tool, in a position in which the fingers 113a and 113b are aligned to be inserted into the receptacles 604 and 606, respectively, via holes 608 and 610. Note that in the example shown the tool 600 extends the reach of the gripper and tool combination well beyond the length of the fingers 113a and 113b, and provides a cushioned distal end, as described above in connection with FIG. 3A.

FIG. 6B is a block diagram illustrating an embodiment of an interchangeable tool for a robotic gripper. In FIG. 6B, the same tool 600 is shown with the fingers 113a and 113b of robotic gripper 112 shown inserted into the receptacles 604 and 606.

In the example shown in FIGS. 6A and 6B, the closing/opening motion and force of the gripper 112 and fingers 113a and 113b is translated into a corresponding closing/opening motion of the arms 616 and 618, and the toolset (fingers/extensions) 304 disposed thereon. However, in various embodiments, the closing/opening motion and force of the gripper 112 and fingers 113a and 113b may be translated into other motions, such as twisting or rotating a shaft, advancing or withdrawing a lance or other tool end, etc.

Figure 7:
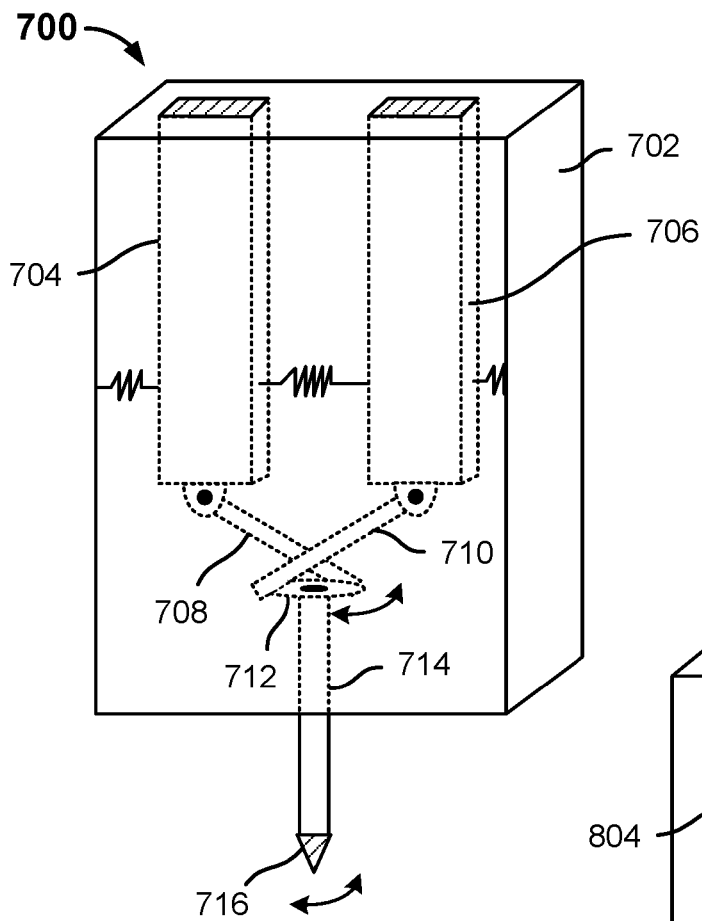
FIG. 7 is a block diagram illustrating an embodiment of an interchangeable tool for a robotic gripper.

FIG. 7 is a block diagram illustrating an embodiment of an interchangeable tool for a robotic gripper. In the example shown, tool 700 includes a body 702 and receptacles 704 and 706 configured to receive gripper fingers. In this example, the mechanical linkage 708, 710 in body 702 translates the closing/opening movement of the receptacles 704, 706 by operation of gripper fingers inserted therein to a rotational motion, by engaging opposite ends of a gear (flange, cam, etc.) 712 fixed to shaft 714, causing shaft 714 and bit 716 on the distal end of shaft to rotate back/forth, as indicated by the two-headed arrows shown in FIG. 7.

While the closing/opening (e.g., compression/release) of the robotic gripper is translated into alternating back/forth rotation in the example shown in FIG. 7, in other embodiments other motion is imparted via a different transmission mechanism that the one shown in FIG. 7.

In some embodiments, wired or wireless connections may be made between the robotic gripper and a tool is has retrieved (e.g., by inserting the gripper into the tool, grasping the tool, etc.) to transmit one or more of electrical power, electrical/electronic control signals, sensor readings, etc. from the gripper to the tool and/or vice versa. For example, a wired connection may be established between the gripper and the tool to transfer electrical power. In some embodiments, pneumatic or hydraulic connections may be made between the gripper and the tool. In some embodiments, power may be transferred wirelessly from the gripper to the tool. For example, inductive or other wireless charging or real time provision of power may be performed. In some embodiments, Wi-Fi, analog RF, or other wireless signals may be transmitted, e.g., from the gripper to the tool to send a command to control the tool or from the tool to the gripper to provide a sensor reading or other feedback.

Figure 8:
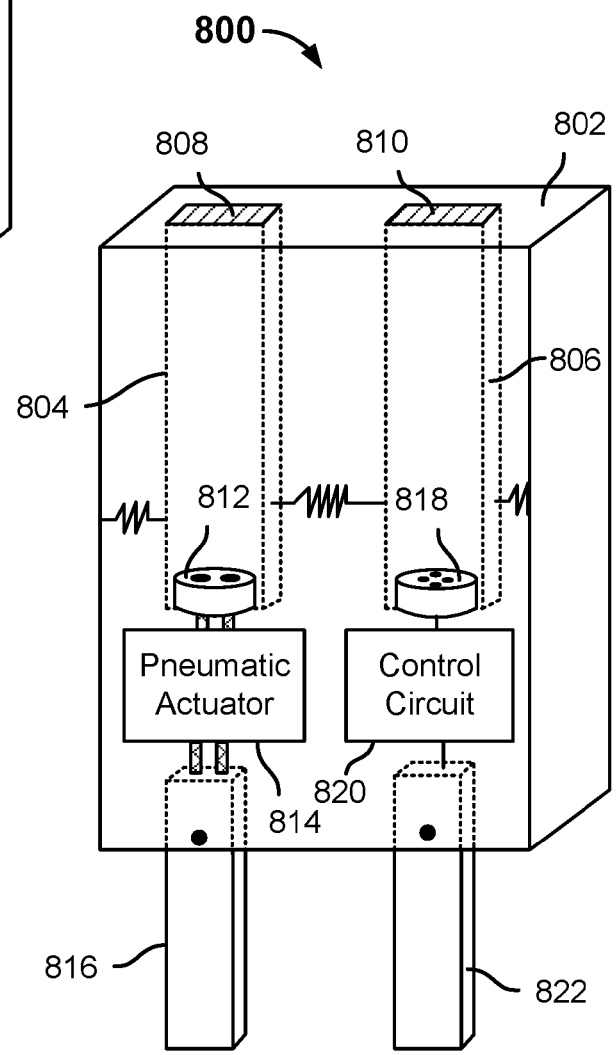
FIG. 8 is a block diagram illustrating an embodiment of an interchangeable tool for a robotic gripper.

FIG. 8 is a block diagram illustrating an embodiment of an interchangeable tool for a robotic gripper. In the example shown, tool 800 includes a body 802 and receptacles 804 and 806, which are configured to receive gripper fingers inserted via holes 808 and 810. In this example, it is contemplated that the gripper fingers inserted into receptacles 804 and 806 have on their distal end mail connectors of a size and shape suitable to be inserted into and/or otherwise mate with connectors 812 and 818, respectively, located at the inner/bottom extreme of receptacles 804 and 806 respectively. In the example shown, connector 812 is configured to receive a pneumatic (e.g., compressed air) connection to supply compressed at to a pneumatic actuator 814 configured to actuate arm 816 and/or a pneumatic tool/finger affixed thereto. Connector 818 by contrast is in this example and electrical/electronic connector configured to supply power and/or transmit control and/or sensor signals between the robot and control circuit 820 associated with arm 822. While pneumatic and electrical/electronic connections are illustrated in FIG. 8, in various embodiments other connections and/or combinations of connection may be made, including without limitation hydraulic or other connections.

In some embodiments, control signals, sensor outputs, and/or other values may be communicated wirelessly between a robot and a tool. For example, Bluetooth™, analog RF, Wi-Fi, and/or other near field or other wireless communication technologies may be used to provide connectivity between a robot and a tool, via a gripper used to retrieve and use the robot. In some embodiments, signals may be communicated wireless between a robot controller and/or other processor and the gripper and/or tool via analog RF communications relayed from segment to segment (e.g., limb to limb) of a robotic arm and/or a gripper affixed thereto. Shunts or other conduits may be used to avoid interference and ensure a sufficient signal to noise level for each leg of the relayed communication.

Figure 9:
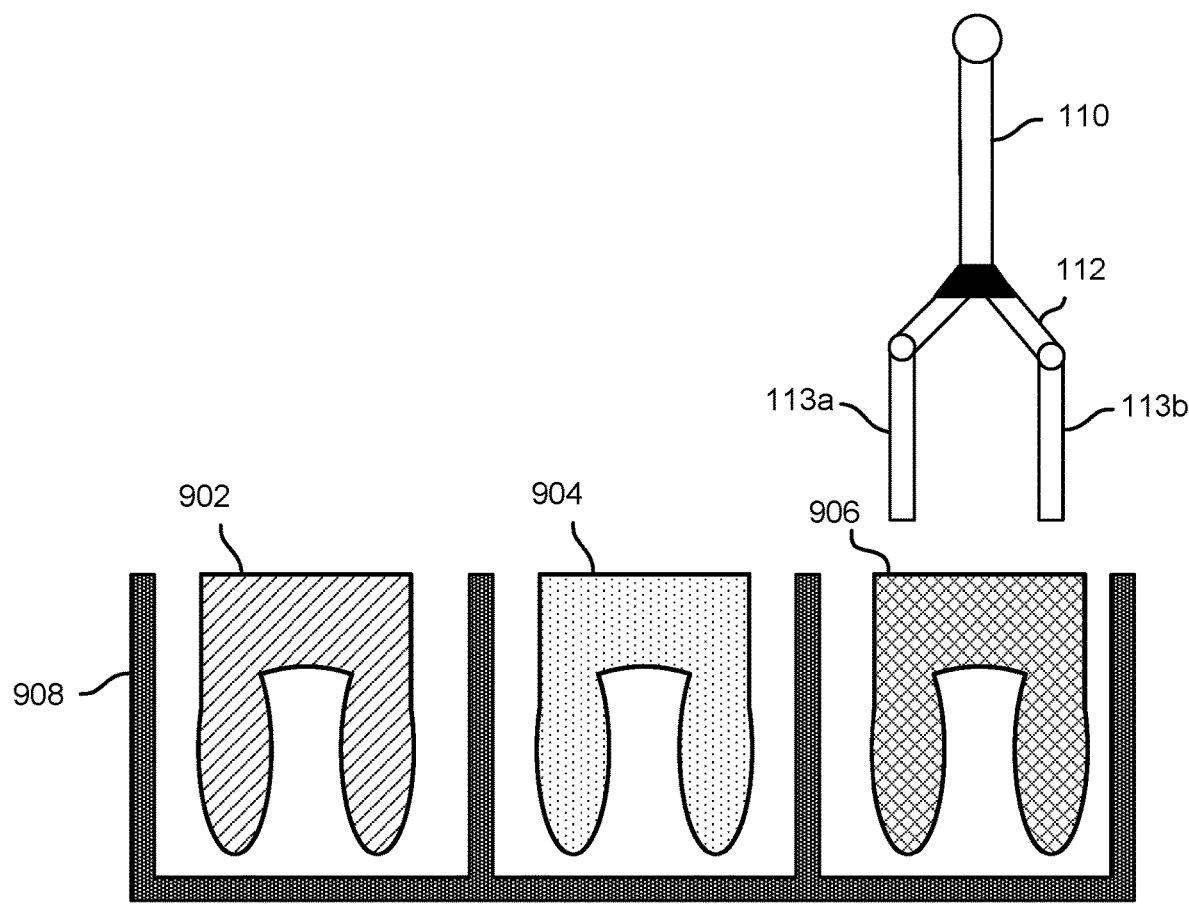
FIG. 9 is a block diagram illustrating an embodiment of a set of interchangeable tools for a robotic gripper.

FIG. 9 is a block diagram illustrating an embodiment of a set of interchangeable tools for a robotic gripper. In the example shown, a set of tools comprising gloves 902, 904, and 906, each having a same or substantially similar shape but each having one or more distinct attributes that distinguishes it from the other tools in the set, such different materials, firmness, tackiness, texture, heat resistance, chemical resistance, etc., is disposed in a tool carrier or belt 908. Tool carrier or belt 908 may be hung or otherwise attached, permanently or interchangeably, on a robot, such as robot 100 of FIG. 1. In the example shown, gripper 112 of FIG. 1 is positioned over glove 906, in a position in which the fingers 113a and 113b are lined up with and positioned to be inserted into corresponding cavities (not shown) in glove 906.

In some embodiments, the fingers 113a and 113b fit snugly into the gloves 902, 904, and 906. Once inserted, a retaining mechanism that holds the selected glove in holder 908 is released, enable the gripper 112 to be withdrawn with the selected glove on. The gloved gripper may then be used to perform a task for which the selected glove (902, 904, or 906, for example) has been selected to perform, e.g., based on a determination that one or more attributes of the selected glove make it the best suited to perform the task.

Figure 10A:
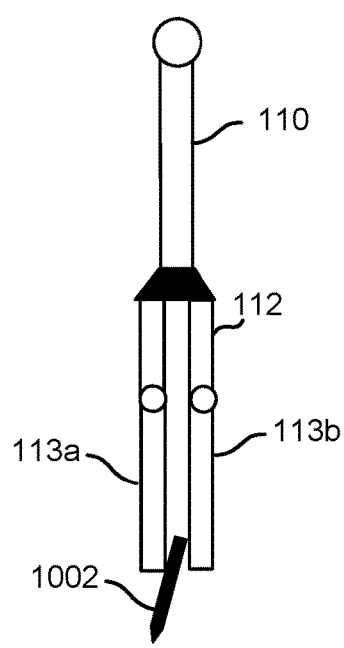
FIG. 10A is a block diagram illustrating an example of a robotic gripper grasping a tool in an embodiment of a robot configured to use interchangeable tools.

FIG. 10A is a block diagram illustrating an example of a robotic gripper grasping a tool in an embodiment of a robot configured to use interchangeable tools. In the example shown, gripper 112 has been used to grasp a tool 1002. The tool 1002 may have been grasped from a holder comprising a set of holders, such as holders 114 of FIG. 1. In this example, the tool 1002 has been grasped at a non-zero acute angle to the vertical orientation of the gripper 112 and segment 110, as shown. In some embodiments, a calibration or other process of detection may be used to determine the actual orientation of the tool 1002, as grasped.

Figure 10B:
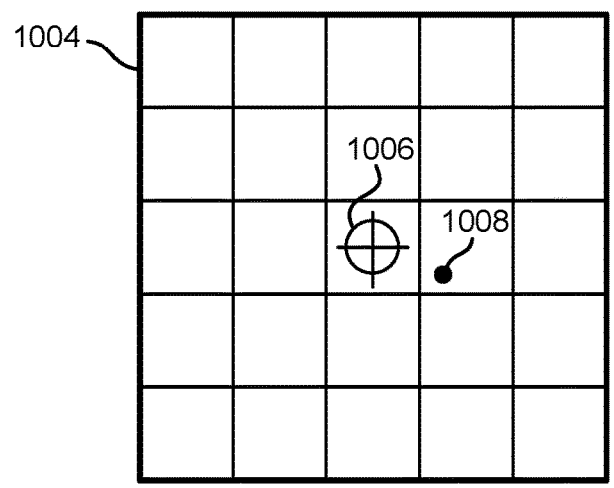
FIG. 10B is a block diagram illustrating an embodiment of a calibration and/or validation sensor pad in an embodiment of a robot configured to use interchangeable tools.

FIG. 10B is a block diagram illustrating an embodiment of a calibration and/or validation sensor pad in an embodiment of a robot configured to use interchangeable tools. In some embodiments, the calibration pad 1004 of FIG. 10B is used to determine and/or validate the orientation of a tool as grasped by a robotic gripper, such as tool 1002 in the example shown in FIG. 10A. In the example shown in FIG. 10B, calibration pad 1004 includes a central target 1006 to which the robot is configured to attempt to touch a distal end of a tool, such as tool 1002, that the robot has grasped with its gripper. The robot uses a model of itself to position its gripper in a position in which the tip of the tool should be directly above the target 1006, based on the expected position of the tip relative to the gripper and/or another structure of the robot. The tool is then touched to the calibration pad 1004, which in various embodiments comprises a capacitive, a resistive, or other touch screen or pad. In the example shown in FIG. 10B, the tip is detected to have been touched at point 1008. In various embodiments, the actual location touched is used by one or more of the robot and an associated controller, computer, and/or other processor to determine the orientation of the tool 1002 as grasped. The orientation information comprises and/or is used to determine corrections to model-based manipulation of the tool by the robot, e.g., by taking the orientation into consideration in determining how to position and move the gripper to use the tool 1002 to perform a task.

In various embodiments, an interchangeable tool—e.g., one that can be grasped or otherwise retrieved by a robotic gripper, may be configured to enable the gripper to be used to conduct tasks more finely, more precisely, with more control, and/or at a smaller or larger scale than could be accomplished (as reliably or well) by the gripper alone.

Figure 11:
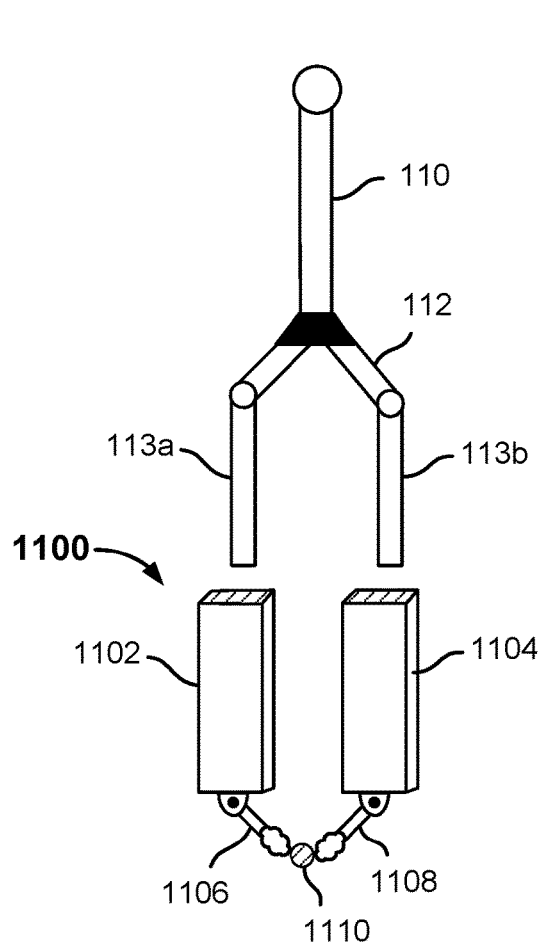
FIG. 11 is a block diagram illustrating an embodiment of an interchangeable tool for a robotic gripper.

FIG. 11 is a block diagram illustrating an embodiment of an interchangeable tool for a robotic gripper. In the example shown, tool 1100 includes fingers/extensions 1102 and 1104, each having at its distal end a small scale tool segment 1106, 1108 with a soft tip. In the example shown, the tool 1100 is being used to grasp and/or manipulate a small, fragile object 1110, which the gripper 112 may not have been able to pick up with sufficient precision or care without the beneficial use of tool 1100.

Tools for a robotic gripper, as disclosed herein, may be used to increase (or decrease) the number of fingers or other digits manipulated by a gripper. For example, a two-fingered gripper may be used to manipulate a tool that includes a three-fingered gripper, or a three- or more-fingered (adaptive) robotic hand.

Figure 12:
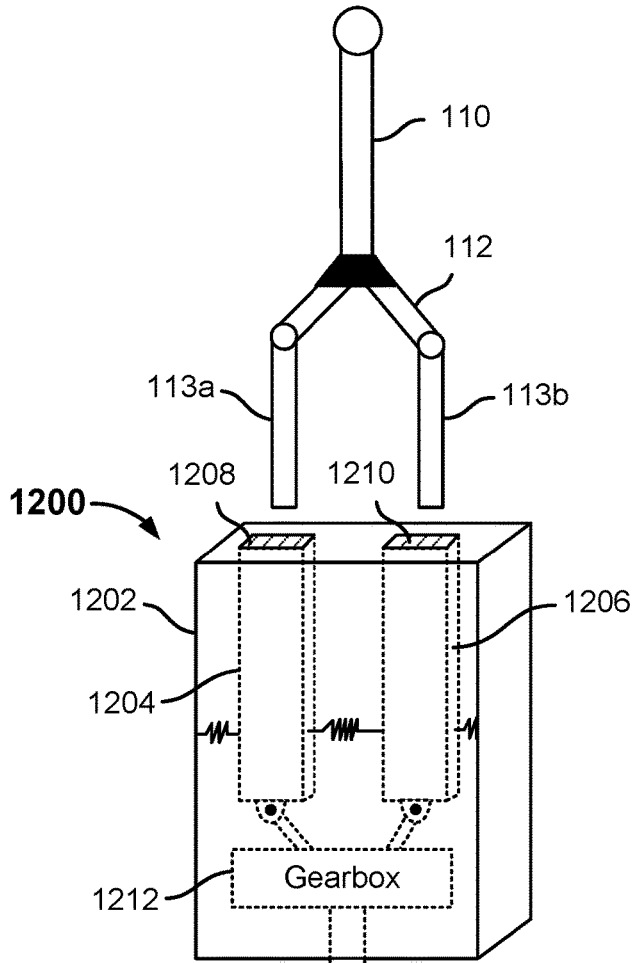
FIG. 12 is a block diagram illustrating an embodiment of an interchangeable tool for a robotic gripper.

FIG. 12 is a block diagram illustrating an embodiment of an interchangeable tool for a robotic gripper. In the example shown, tool 1200 enables a two-fingered gripper to be used to retrieve and use a three-pronged claw type grabber 1214. The tool 1200 includes a body 1202, receptacles 1204 and 1206 entered via holes 1208 and 1210, and a gearbox (or other transmission) 1212 to translate closing/opening motion of gripper fingers 113a, 113b inserted into receptacles 1204 and 1206 into closing/opening action of claw 1214.

Figure 13:
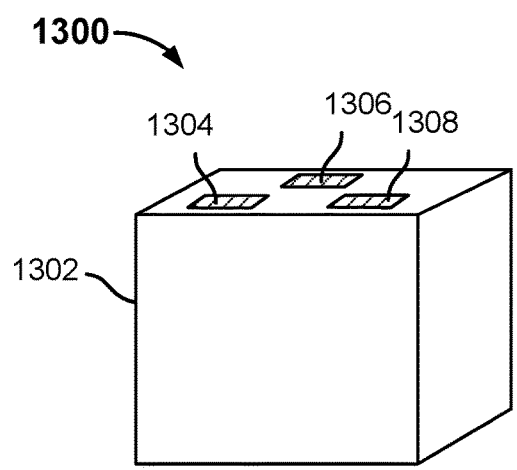
FIG. 13 is a block diagram illustrating an embodiment of an interchangeable tool for a robotic gripper.

FIG. 13 is a block diagram illustrating an embodiment of an interchangeable tool for a robotic gripper. In the example shown, tool 1300 includes a body 1302 and three receptacles 1304, 1306, and 1308 into which a three-fingered robotic gripper or hand is configured to be received. In various embodiments, a tool as disclosed herein may be configured to receive as many or as few digits as the robotic gripper affixed to the robot and/or robotic arm may comprise.

In some embodiments, a robot or robotic arm as disclosed herein may be configured to retrieve and use an extension to the robotic arm itself. The extension may have one or more robot arm segments, zero or more additional joints, and/or a gripper or hand. In some embodiments, the robot is configured to determine that to perform a task the arm extension should be shed. For example, the weight of the arm extension may be too high in light of the load to be lifted. The robot in some embodiments would be determined to detect such a condition, shed the arm extension, and use the remaining robotic arm segments and/or a gripper at the end, with or without retrieving a tool, as appropriate and/or required, to perform the task. Once completed, the robot is configured to retrieve and reattach the arm extension to perform a subsequent task, e.g., one for which the added range and/or flexibility of having the added segment(s) may be helpful or necessary.

In various embodiments, techniques disclosed herein may be used to enable a robotic gripper to be used to perform a wide variety of tasks, having a wide variety of requirements, without having to manually exchange or adjust the gripper to render it more suitable to a given task.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robot, comprising:
   a robotic arm having a gripper disposed at a free moving end of the robotic arm; and
   a set of two or more tools configured to be grasped or otherwise engaged by the gripper;
   wherein the robot is configured to select from the set of two or more tools a selected tool to be used to perform a task; use the gripper to retrieve the selected tool from a location; use the tool to perform the task; and return the tool to the location.

2. The robot of claim 1, wherein the robot determines the selected tool based at least in part on an attribute of an object with which the task is associated.

3. The robot of claim 2, wherein the attribute comprises one or more of a size, weight, material, density, rigidity, and fragility of the object.

4. The robot of claim 2, wherein the robot further includes a camera and is configured to determine the attribute based at least in part on image data generated by the camera.

5. The robot of claim 2, wherein the robot is configured via machine learning to recognize the object and determine the attribute.

6. The robot of claim 1, wherein the location comprises a tool holder.

7. The robot of claim 6, wherein the tool holder is mounted on the robot in a manner that allows the tool holder to be removed and replaced with a different tool in a different holder.

8. The robot of claim 7, wherein the tool holder is included in a removable first set of tools and the robot is configured to replace the removable first set of tools and associated tool holders with a replacement set of tools and tool holders.

9. The robot of claim 1, wherein one or more of the tools in the set of two or more tools includes an electrical connector to enable electrical power to be supplied from the robot to the tool via a corresponding electrical connector incorporated into or otherwise associated with the gripper when the gripper is engaged with the tool.

10. The robot of claim 1, wherein one or more of the tools in the set of two or more tools includes a wireless charging pad, antenna, or other physical interface to enable electrical power to be supplied wirelessly from the robot to the tool.

11. The robot of claim 1, wherein one or more of the tools in the set of two or more tools includes a pneumatic or hydraulic connector to enable a pressurized fluid to be supplied from the robot to the tool via a corresponding connector incorporated into or otherwise associated with the gripper when the gripper is engaged with the tool.

12. The robot of claim 1, wherein one or more of the tools in the set of two or more tools is sized and configured to operate on objects of a different scale than the gripper.

13. The robot of claim 1, wherein the gripper comprises a two-fingered gripper.

14. The robot of claim 1, wherein the gripper comprises three or more fingers.

15. The robot of claim 1, wherein the gripper includes a plurality of articulated digits each having two or more segments.

16. The robot of claim 1, wherein the robot is configured to retrieve the selected tool at least in part using a model of the robot and a position of the location relative to a frame of reference.

17. The robot of claim 1, wherein the location comprises a tool holder, each tool in the set of two or more tools has an associated tool holder, and each of the tool holders is configured to hold its corresponding tool in a restrained position that facilitates retrieval by the gripper.

18. The robot of claim 17, wherein the tool holder is further configured to release the tool upon receiving an indication that the gripper has mated with the tool.

19. The robot of claim 1, wherein the robot is configured to use the gripper to retrieve the tool by using the gripper to grasp the tool.

20. The robot of claim 1, wherein the robot is configured to use the gripper to retrieve the tool by inserting the gripper into the tool.

21. The robot of claim 1, wherein the robot is further configured to use a sensor associated with the gripper to retrieve and use the selected tool.

22. The robot of claim 1, wherein the selected tool includes a sensor and the robot is further configured to receive and use a sensor output of the sensor to use the selected tool to perform the task.

* * * * *